Patented June 2, 1942

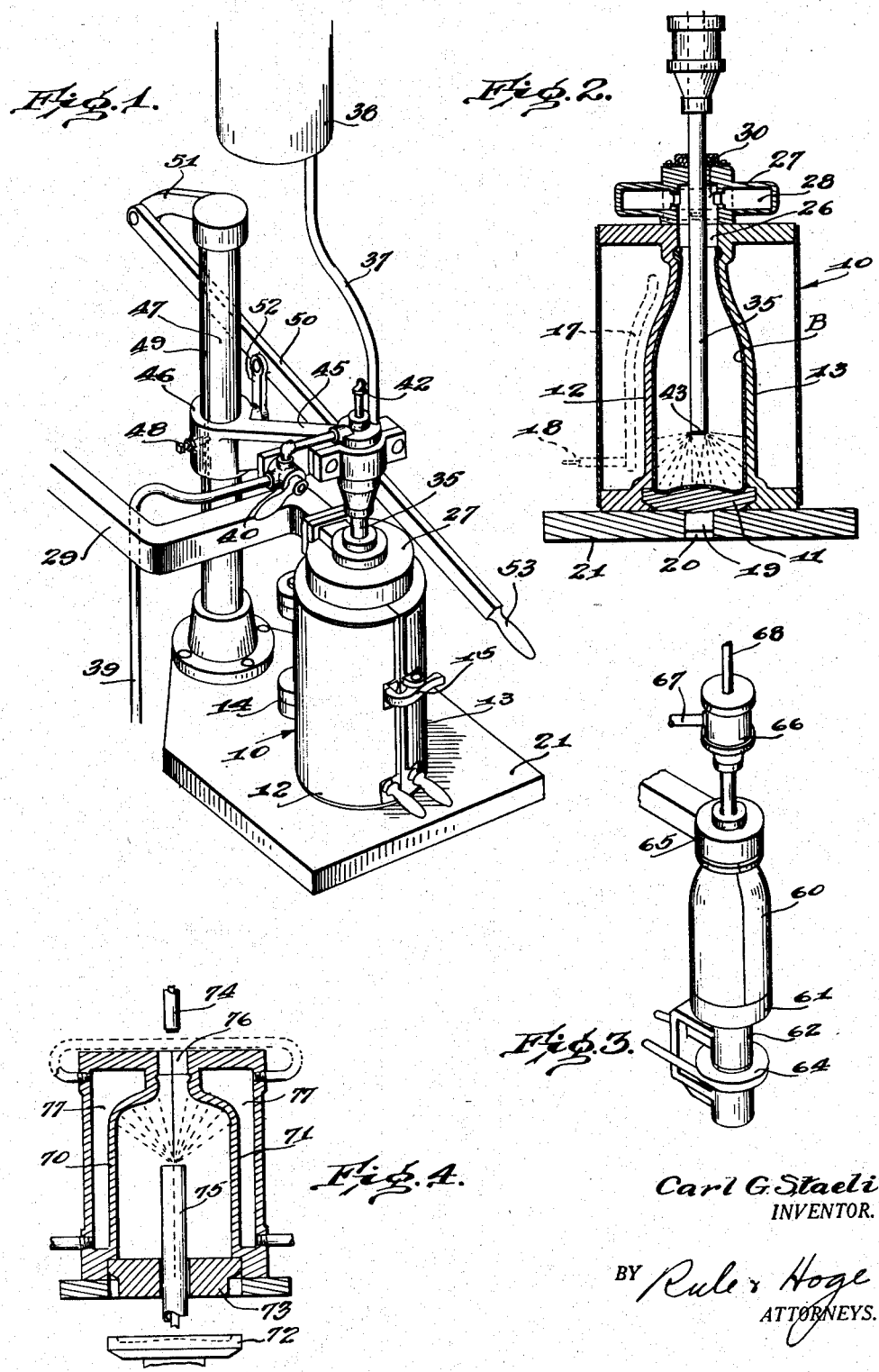

2,285,370

UNITED STATES PATENT OFFICE 2,285,370

METHOD OF FORMING HOLLOW ARTICLES

Carl G. Staelin, Toledo, Ohio, assignor to Owens-Illinois Glass Company, a corporation of Ohio Application January 13, 1938, Serial No. 184,828

2 Claims. (Cl. 18—58)

The present invention relates to a method of forming hollow articles such as bottles, jars, containers, tumblers, figures or similar articles, and more particularly to hollow articles composed of plastic materials such as synthetic or natural resins or plastics generally of the thermosetting type.

One of the objects of the present invention is to provide a very simple method of forming a bottle or similar article of any desired shape from plastic materials, these bottles having, if desired, thin walls and predetermined distribution of material throughout the surface thereof. By providing uniformly thin walls, greater economy of material may be effected, and if desired, additional material may be applied to those subjected to the greatest strain.

Broadly considered, the present invention is directed to a method which may be practiced with an apparatus for forming a hollow article by spraying or squirting a fluid substance on the inner surface of a suitable hollow mold, causing it to solidify, and then removing it from the mold in the ordinary manner. Ordinarily, partible molds are preferred in order to permit ready removal of the articles.

An object of the present invention is to provide a method which may be used to decrease the setting time of the material by the adjustment of the pH of the material.

Various resinous materials in the thermosetting fields, such as phenol aldehydes, urea formaldehyde reaction products, furfural resins, or the like may be used. It is also possible to apply the materials in diluted, emulsion or solution form, by spraying the same and withdrawing the solvent or diluent by means of heat and/or suction applied through the neck, or by absorption through porous mold walls.

When using thermosetting materials, it is preferable to provide heated molds in order to accelerate polymerization and hardening of the material. When using materials which are affected by an adjustment of their pH, such as urea or phenol formaldehyde, it is within the contemplation of the invention to lower or otherwise adjust the pH of the material just prior to or as the material is being sprayed, whereby the material may be handled and sprayed at a low viscosity, but after spraying the material will rapidly set up and solidify. In accomplishing these ends, various expedients may be resorted to. For example, if a thin walled article is to be made, it is possible to slightly acidify the wall surface of the mold so that as the resinous material is sprayed to the surface thereof, the pH thereof will be lowered and polymerization will be accelerated. It is also possible to atomize the material to be sprayed by means of a gas acidified by a suitable acid material such as chlorine, hydrogen chloride vapors, sulphur dioxide gas, carbonic acid gas, lactic acid, combinations thereof, or the like. A particular advantage of this method is that the acidification does not take place until the very time at which the material is being sprayed, and thus the fluidity of the material may be maintained until the spraying step. At the spraying step, however, the condensing agent or accelerator acts on the liquid as it is being atomized, and owing to the close and intimate contact with the liquid, causes a uniform and rapid acceleration of the polymerization and hardening of the mass.

Another object of the present invention is to produce by the spraying means a laminated container or other hollow article. In producing such an article, it is possible to place a suitable sheet form, as, for example, a paper, cloth, screens or other sheet article into the mold, and then insert the spraying or other discharge conduits into the neck of the form in order to spray or otherwise deposit upon the inner surface of the form the plastic materials. Pressure may be used in conjunction therewith to blow the form outwardly against the sides of the mold to produce a sharp impression against the contours thereof.

If a paper, cloth or other pervious form is used, the resinous material will soak through, embedding the form into the plastic material. It is possible to apply designs, colors, labels, etc. to the form which will show through the resinous material, especially if the latter is transparent. In this connection, it is possible to place a label or cut-out design of desired shape into the mold and spray the resinous material thereon to form the bottle in such a manner that the label or design is embedded in the resin and held in proper position.

It is also possible to apply accelerating or condensing agents to the paper, cloth, or other form prior to its placement into the mold, so that when the plastic material is sprayed onto the form, polymerization and setting up will be accelerated, whereby the forming cycle may be reduced.

The mold may be composed of any suitable material such as ordinary metals, and is preferably smooth or polished or plated with chromium or the like to facilitate removal from the mold. It may also be coated with a suitable oil, wax, resin or the like, which preferably is incompatible with the material to be sprayed whereby removal of the article may be readily accomplished after the material has hardened.

Other objects and advantages of the present invention will become apparent from the following description taken in conjunction with the drawing, in which:

Fig. 1 is a diagrammatic perspective view of an apparatus adapted for practicing the present invention;

Fig. 2 is a cross-sectional elevational view of the mold and spraying mechanism of Fig. 1;

Fig. 3 is a diagrammatic perspective view of a modified apparatus; and

Fig. 4 is a diagrammatic cross-sectional view of a modified embodiment of the present invention.

Referring now more particularly to Figs. 1 and 2 of the drawing, reference character 10 broadly designates a partible mold composed of a bottom plate 11 and mold sections 12 and 13 respectively, which are held together at the back by means of a hinge 14 and at the front by means of a suitable lock 15. The mold sections may each be provided with a temperature regulating means 17 as, for example, an electrical heating element having electrical connection 18. If desired, the temperature may be lowered by any suitable means such as a draft of cooling gases.

The bottom plate 11 may be provided with a downwardly projecting lug 19 adapted to fit into a receiving opening 20 of a base plate 21.

Overlying the neck opening 26 of the mold cavity, is a suction head 27 adapted to scavenge and withdraw the atomizing gases, or any gases or solvent evolved from the sprayed liquid. The suction head 27 also withdraws excess mist which might otherwise float around and contaminate the surrounding atmosphere.

The suction head 27 is provided with a suction chamber 28 communicating through a conduit 29 to a suitable exhaust mechanism (not shown). The center of the suction head 27 is provided with an axial opening 30 adapted to register with the neck opening 26 of the mold, whereby a suitable spray head 35 may be introduced into the cavity of the mold.

Various types of spraying mechanisms or spray heads 35 may be used, as, for example, those disclosed in the Patents 2,046,592; 1,908,230; 2,086,987; 1,706,875 and 2,019,941. The exact type of spray head used may depend upon the size of neck opening into which the spray head must be inserted, the type and viscosity of the material which must be sprayed, and the desired pattern of spray dictated by the particular type or design of article to be produced, as one skilled in the art would understand. In Fig. 2 a bottle B is shown being formed.

The liquid may be fed into the upper end of the spray head through a suitable conduit 37 communicating with a supply chamber 38. Air under pressure may also be provided through a pipe or hose 39, and through adjusting valve 40 into the upper portion of the spray head adapted to control the spray. If the type of spray head is such as shown in Patent No. 2,046,592, an adjusting needle 42 may be provided to adjust the pattern and flow of spray to be issued from the nozzle 43 at the end of the spray head. Heated air is desirable in many instances to assist setting of thermo-setting material upon the side walls of the mold and prevent it from running down and settling on the bottom. This would also tend to counteract the chilling of the air due to expansion.

The spray head 35 may be mounted at one end of a suitable arm 45 having a collar 46 at the opposite end thereof adapted to fit around and be supported by an upstanding column 47. The collar 46 is slidably mounted upon the column 47 and is adapted to permit reciprocation of the spray head 35. A removable key or set-screw 48 may be provided in the collar 46 adapted to ride in slot 49 to maintain the spray head in alignment with the mold 10. The lower end of the column 47 may be mounted upon the base plate 21.

The spray head 35, the arm 45, and the collar 46 may be reciprocated by means of a lever 50 fulcrumed at one end to an arm 51 which is secured to the upper end of the column 47. A suitable connecting link 52 connects the lever 50 with the collar 46. A handle 53 may be fashioned at the free end of the lever 50 in order to facilitate raising and lowering of the lever by manual or other suitable means.

In operation of this device, the mold 10 is first locked in a closed position. The spray head 35 is thrust through the opening 30 of the suction head, and through the neck opening 26 of the mold, and is caused to spray a layer of resinous material against the inner surface of the mold 10 to predetermined thicknesses at the various areas thereof. The spray head 35 is then withdrawn and the material solidified, whereupon the mold may be opened and the article removed. If necessary, the article may be placed in suitable ovens adapted to cure the resins to final hardness. The suction head 27 serves to withdraw the atomizing air from the mold and any entrained mist which may not have impinged upon the surface of the mold. If a laminated article is to be made, the form of sheet material is inserted into the mold cavity and then sprayed to form the article. If desired, air pressure may be applied to the interior of the mold.

Referring now more particularly to Fig. 3, I have illustrated a modified embodiment of the present invention similar to that illustrated in Figs. 1 and 2 except that the mold may be rotated, if desired, in order to produce a uniform and more even coating of the material over the surface thereof.

The apparatus comprises a partible mold 60 mounted upon a rotating shaft 61 which is held by the bearings 62 and 63, and rotated by means of a pulley and belt 64 or other suitable means. A suction head 65 may be applied over the top of the mold 60, communicating with the interior through the neck opening. A spray head 66 which may be similar in design to the spray head shown in Figs. 1 and 2, may be moved up and down in the neck opening of the mold 60 through the suction head. Compressed air connection and liquid connection 67 and 68 respectively, may be provided for the spray head 66. The operation of this device is similar to that brought out in connection with Figs. 1 and 2. If desired a plurality of individual sprays may be applied to the article.

Referring now more particularly to Fig. 4, there is illustrated an apparatus adapted to utilize two spray heads, one from above and one from below. The apparatus comprises mold sections 70 and 71, respectively, forming the side walls of the mold cavity, and a bottom plate 72 capable of reciprocatory movement up and down to fit in position at the bottom of the mold. The apparatus is also provided with two spray heads 74 and 75, one for above and one for below. The top spray head 74 is adapted to be inserted into the mold cavity through the neck opening 76, while the bottom spray head 75 is adapted to be applied through the bottom of the mold cavity when the bottom plate 72 is removed. The bottom spray head 75 may be provided with a closure plate 73 adapted to close off the mold cavity when the spray head 75 is in operative position.

The mold sections 70 and 71 may each be provided with chambers 77 adapted to circulate steam or cooling water as required to regulate the temperature of the molds. They may also be provided with electrical resistors for applying heat to the mold section. These temperature regulating devices are operable to accelerate the setting and hardening of the applied material.

In operation of this device, the mold sections 70 and 71 are closed, and the bottom plate 72 is lowered away out of contact with the mold section. The bottom spray head 75 may then be raised into position and inserted into the mold cavity to apply a layer of plastic material over the inner surface of the mold. If desired, the spray head 74 may simultaneously be lowered into position adapted to spray the side walls of the neck and/or side walls of the cavity.

The bottom spray head 75 may be gradually lowered to coat the side walls of the mold cavity and should then be withdrawn, whereupon the bottom plate 72 is to be immediately brought up into position to close off the bottom of the mold. The spray head 74 is then lowered to complete the deposition of plastic material around the side walls and over the bottom plate 72. Preferably the deposition is carried on as quickly as possible so that the article may be uniform and free from cracks and laminations. It is also desirable to rotate the mold in order to provide a more uniform distribution around the periphery thereof. Suction heads similar to those disclosed in Figs. 1 and 2 may also be used in conjunction with the spray head.

Articles made in accordance with the present invention may be treated or machined as desired. For example, the articles may be further coated on the inside or outside by dipping or spraying; they may be built up in laminations or reinforced, and may be decorated, colored and have labels attached thereto either before or after removal from the molds.

Modifications and variations may be resorted to within the spirit and scope of the present invention, as defined in the appended claims. For example, my apparatus involving the use of one or more spray heads, and, if desired, a suction head, may be used for applying various thermosetting or thermoplastic materials such as plasticized urea or phenol formaldehyde, vinyl acetate of chloride, or other vinyl compounds, methylmethacrylate, glyptal resins, ethyl cellulose or cellulose derivatives, styrene resins, furfural resins, etc.

I claim:

1. In the method of coating with a thermosetting material whose polymerization is accelerated by a lowering of the pH value, the step which comprises atomizing and spraying said material by means of an acidified gas.

2. The method of coating a surface with a thermosetting material whose polymerization is accelerated by a lowering of the pH value, which comprises atomizing the material with an acidified gaseous medium which lowers said pH value, and applying said atomized material to said surface and thereby coating said surface with the said material.

CARL G. STAELIN.